United States Patent [19]
Wakley et al.

[11] Patent Number: 5,498,130
[45] Date of Patent: Mar. 12, 1996

[54] COOLING FAN MOUNTING SYSTEM

[75] Inventors: Ronald J. Wakley, Centerville; Michael E. Rutt, Springboro, both of Ohio

[73] Assignee: ITT Automotive Electrical Systems Inc., Auburn Hills, Mich.

[21] Appl. No.: 324,547

[22] Filed: Oct. 18, 1994

[51] Int. Cl.⁶ .......................... F04D 29/64; F04D 29/52
[52] U.S. Cl. .................................. 415/213.1; 415/121.2
[58] Field of Search .................... 415/121.2, 213.1, 415/214.1, 220; 416/247 R

[56] References Cited

U.S. PATENT DOCUMENTS

| | | | |
|---|---|---|---|
| 3,204,546 | 9/1965 | Krell | 415/121.2 |
| 4,335,646 | 6/1982 | Jacquet et al. | 416/247 R |
| 4,353,680 | 10/1982 | Hiraoka et al. | 415/214.1 |
| 4,834,615 | 5/1989 | Mauch et al. | 415/213.1 |
| 5,080,501 | 1/1992 | Siebert et al. | 384/537 |
| 5,232,341 | 8/1993 | Shier et al. | 415/201 |

FOREIGN PATENT DOCUMENTS

| | | | |
|---|---|---|---|
| 0387987 | 9/1990 | European Pat. Off. | 415/213.1 |
| 53-43168 | 10/1979 | Japan | 415/214.1 |

*Primary Examiner*—Thomas E. Denion
*Assistant Examiner*—Michael S. Lee
*Attorney, Agent, or Firm*—Dykema Gosett

[57] ABSTRACT

A mounting system for an engine cooling fan. The system includes a shroud for enclosing and supporting the fan and a bracket with a mounting seat for supporting the shroud. The shroud includes three twist locks circumferentially located at an angular distance of 90° from each other. Each of the locks has an arm located at a side surface of the shroud and protruding outwardly radially from the side surface and a first cantilever extending from the arm at a substantially right angle to the arm.

8 Claims, 3 Drawing Sheets

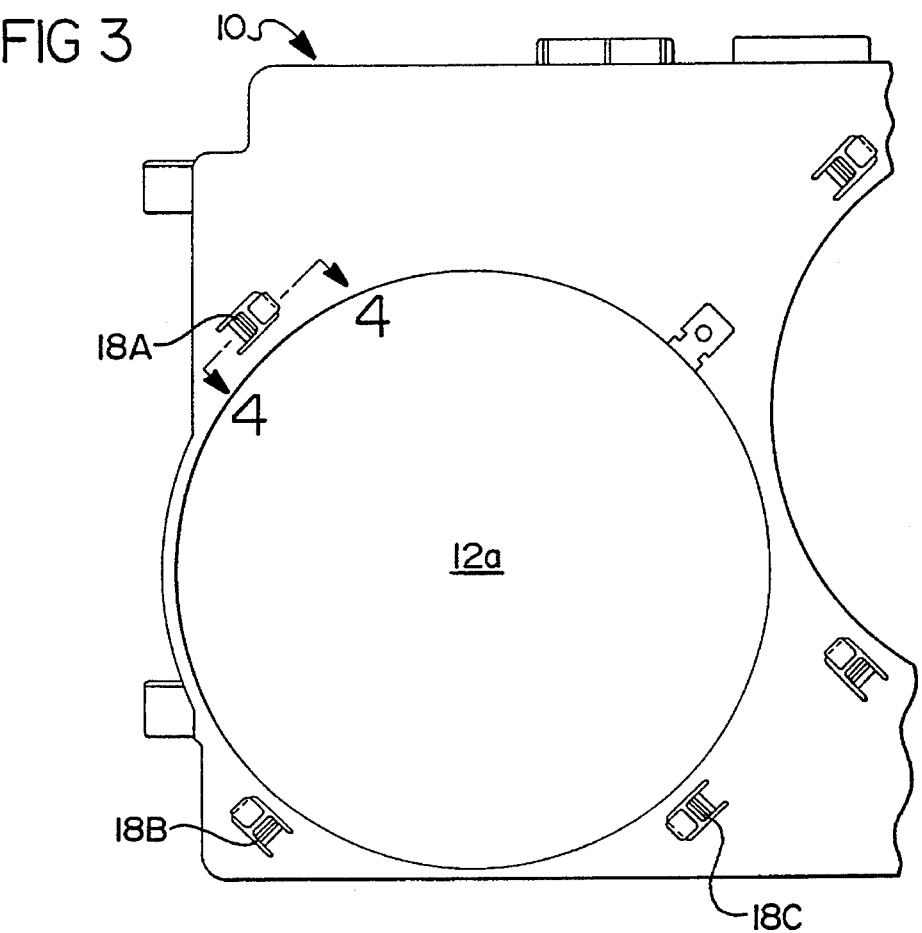
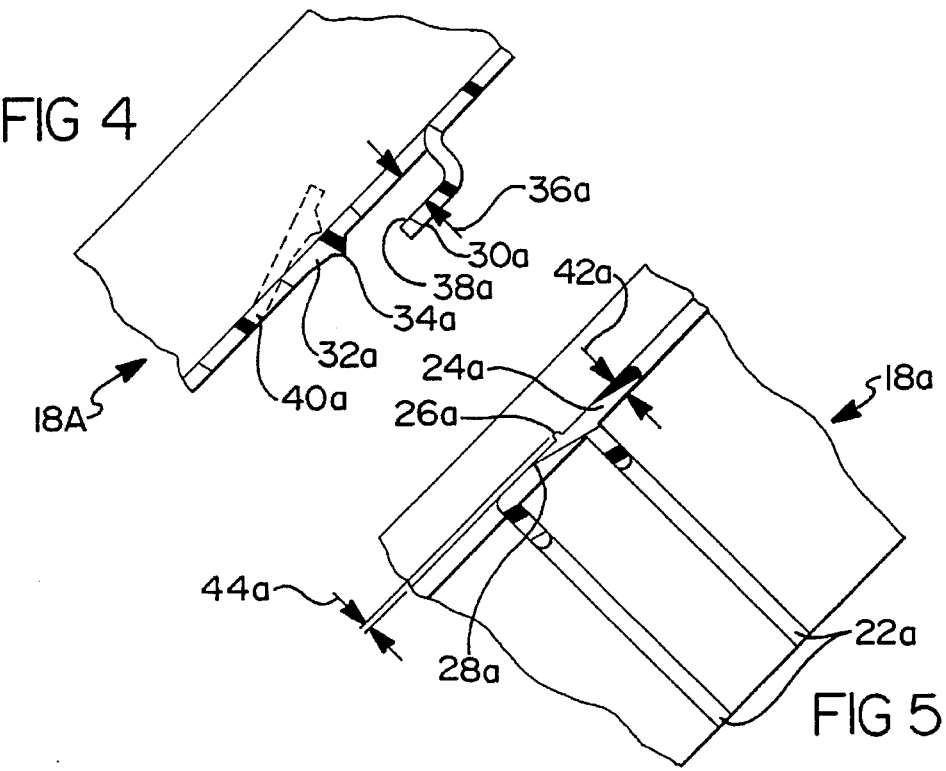

5,498,130

COOLING FAN MOUNTING SYSTEM

BACKGROUND OF THE INVENTION

I. Field of the Invention

The invention relates to car engine cooling fans, and more specifically to fan assembly shrouds for supporting fans.

II. Background

Currently in cars, fan motors are used for engine cooling and are mounted into a circular shroud having four pads equally spaced around the perimeter. Each pad typically includes a screw and washer for mounting the shroud to a support structure. It is not uncommon for two of these round shroud assemblies to be pre-assembled to a support structure, such as a plastic bracket, by using J-clips, screws and washers and then the whole pre-assembly is placed and fastened within the vehicle. This construction requires eight screw and washer assemblies and eight J-clips.

In the light of the above, a need exists in the art for means allowing for more simple, reliable and less labor intensive system for fastening a fan shroud assembly to a car.

SUMMARY OF THE INVENTION

It is therefore an object of the present invention to provide a fastening arrangement in a car engine air cooling system for attaching a fan shroud to a bracket.

These and other objects are accomplished by the present invention in which a lock feature for a car engine air cooling system, having at least one fan, a shroud for enclosing the fan, and a bracket with a mounting pad for the shroud, comprises at least one twist lock having an arm located at a side surface of the shroud and protruding radially from the side surface, a first cantilever extending from the arm at a substantially right angle to the arm, and a mounting seat at the bracket matching the first cantilever and having a clinch to be engaged by the first cantilever upon applying the shroud to the bracket and twisting the shroud relative to the bracket.

There is also provided an ear located at the side surface of the shroud and a hole in the bracket coinciding with a hole in the ear in the twisted position of the shroud. A fixing means is fed through the holes for fixing the shroud to the bracket.

An additional feature comprises a means for forcibly carrying out the engagement of the first cantilever and clinch.

The forcing means comprises a first rib made on a surface of the first cantilever and a second cantilever made on the bracket. The second cantilever is provided with a second rib and adapted to resiliently yield when the second rib is being passed by the first rib upon the twisting of the shroud to the coinciding position. A clearance between a plane of an inner surface of the clinch and a plane of an outer surface of the second cantilever is made no less than combined width of the first cantilever and height of the first rib.

Preferably two or more twist locks are provided each being spaced at an angular distance of 90° from each other.

With these and other objects and advantages in view, the present invention will be clearly understood from the ensuing detailed description in connection with the drawings.

BRIEF DESCRIPTION OF THE DRAWINGS

FIG. 3 is a front view of a part of a bracket showing mounting seats for the shroud according to the present invention.

FIG. 4 is a close cross-sectional view of the mounting seat taken generally along the line 4—4 of FIG. 3.

FIG. 5 is an enlarged cross-sectional view of an arm and a first cantilever taken generally along the line 5—5 of FIG. 2.

DETAILED DESCRIPTION OF THE PREFERRED EMBODIMENT

Figure 1:
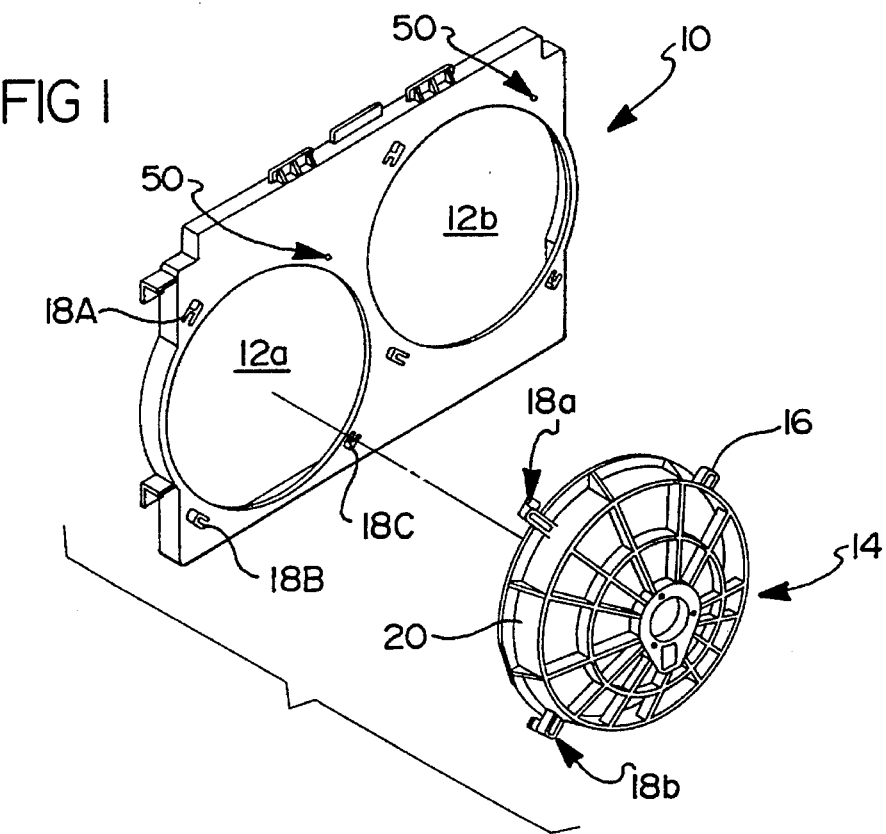
FIG. 1 is an exploded view of a preferred embodiment of the present invention.

Referring now to FIG. 1, an exploded view is shown of a bracket 10 with two openings 12a and 12b and a shroud 14 used in cars for enclosing fan blades and supporting fan motors (fan blades and fan motors not shown). For simplicity, only one of two identical shrouds is shown. The general construction of the shroud and bracket is known to those skilled in the art, and the importance of this invention relates to the means of attaching shroud 14 to bracket 10.

Figure 2:
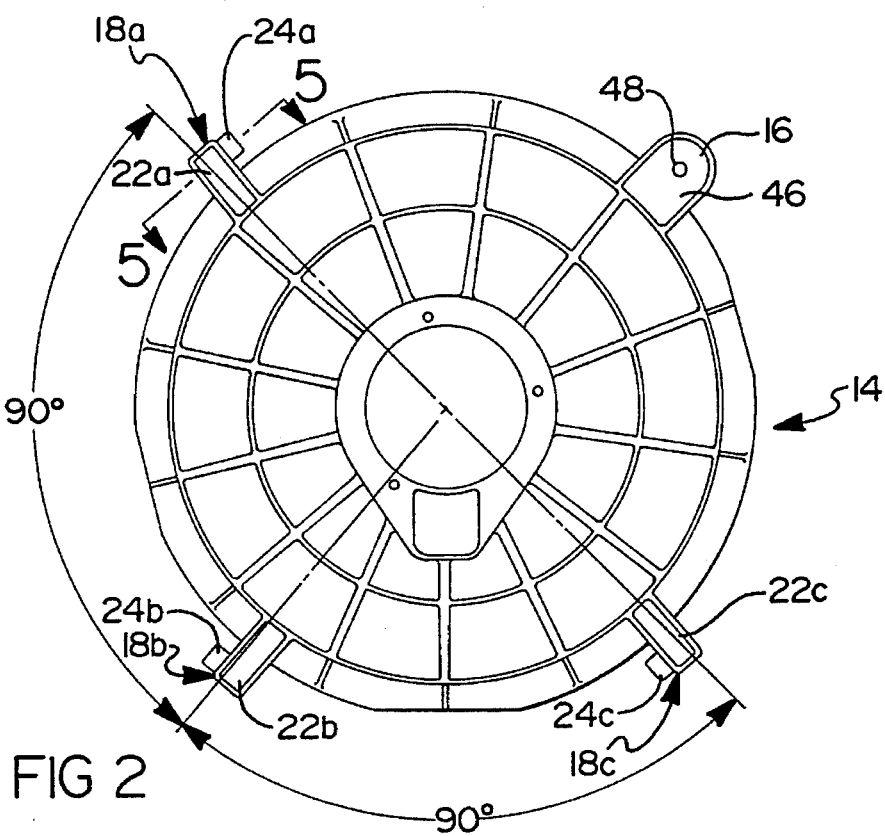
FIG. 2 is a front view of a shroud according to the present invention.

Shroud 14 includes a mounting pad 16 and three identical twist lock tabs 18a–18c. Bracket 10 includes portions 18A–18C located around the circumference of openings 12a and 12b. As it can be best seen in FIG. 2, three shroud parts 18a–18c (as well as their counterparts 18A–18C on bracket 10) are spaced with an angular distance of 90° between 18a and 18b and between 18b and 18c. Each of the lock bracket parts 18a–18c comprises an arm 22a–22c, respectively, protruding radially outwardly from surface 20 and a first cantilever 24a–24c extending from the respective arm at preferably 90°. Now referring to FIG. 5, a first rib 26a resides on an underside 28a of first cantilever 24a and preferably extends the full width of cantilever 24a.

Each of lock bracket parts 18A–18C (FIG. 3) comprises a clinch 30a (see FIG. 4), a second cantilever 32a, and a second rib 34a thereon. There is a clearance 36a between a plane 38a of the inner surface of clinch 30a and a plane 40a of the outer surface of second cantilever 32a. The clearance 36a is chosen such that it is no less than a thickness 42a of first cantilever 24a plus a height 44a of first rib 26a. Second cantilever 32a is made flexible and adapted to resiliently yield upon sliding contact between first, 26a, and second, 34a, ribs. Preferably, bracket 10 and shroud 14 are comprised of plastic, nylon, fiber glass, or other such strong, lightweight material.

Mounting pad 16 (FIG. 2) includes an ear 46 having a hole 48. A hole 50 resides in bracket 10 and coincides with hole 48. A fixing means, for example a screw, a washer, and a j-clip (all three are not shown) are suitable to fasten the shroud 14 to the bracket 10 through the holes 48, 50.

Figure 6:
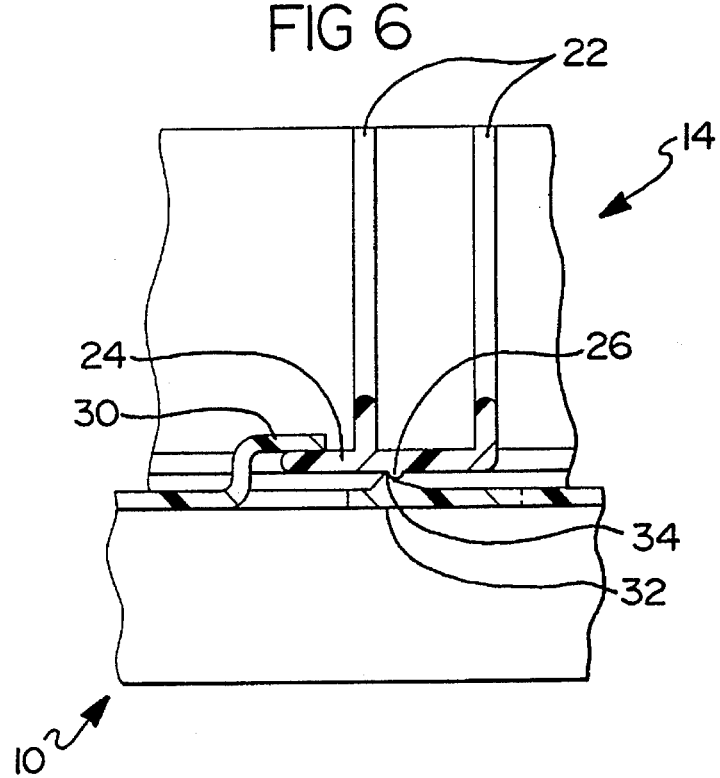
FIGS. 6 and 7 are enlarged views showing the sequence of engaging the arm, the first cantilever, and a first rib of the shroud about a clinch and a second cantilever with a second rib of a mounting seat before engagement of the ribs and after engagement, respectively.
Figure 7:
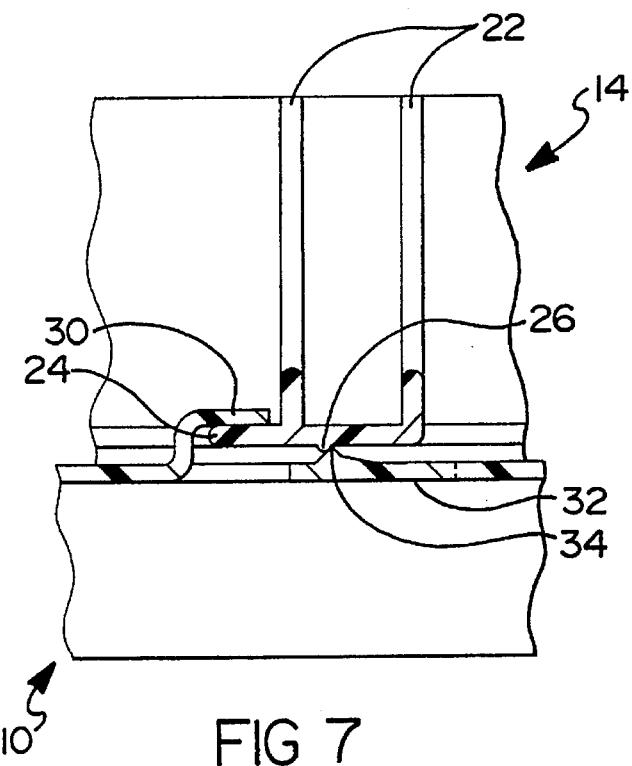

In operation, shroud 14 is applied to bracket 10 such that each cantilever 24a, 24b, and 24c is positioned adjacent to its associated lock 18A, 18B, and 18C, respectively. When twisted clockwise, the shroud 14 engages the bracket with first cantilevers 24 sliding relatively easily under respective clinches 30 until ribs 26 engage second ribs 34 (FIG. 6 showing one pair of cooperating ribs). If an increasing force is exerted, second cantilevers 32 will yield and first rib 26 will pass over second rib 34. Once this engagement is completed, parts assume positions similar to shown in FIG. 7. Once locked in place, the shroud is constrained from rotating, backing out and lifting. The assembly is then fastened together in one location by the screw, washer, and j-clip with the use of holes 48 and 50.

It should be understood that though the lock feature in accordance with the present invention has been described in detail it may be subjected to modifications and other embodiments incorporating the inventive features. Accordingly, it is intended that the foregoing disclosure is to be considered as illustrating the principles of the invention as an example of those features and not as a delimiting description, which is the purpose of the claims that follow.

What is claimed is:

1. A fan mounting system, comprising a shroud having a first twist lock coupler, and a bracket having a second twist lock coupler, wherein said first and second twist lock couplers include a first and a second cantilevers, respectively, said first and second cantilevers including rib portions, and wherein said first and second twist lock couplers are adapted to matingly engage and retain said shroud to said bracket when said first and second cantilevers are placed adjacent to each other and are twisted relative to each other to have said ribs gone beyond each other.

2. The system of claim 1, wherein said first twist lock coupler includes an arm extending radially from said shroud and said first cantilever extends from said arm.

3. The system of claim 1, wherein said shroud includes a mounting pad and said bracket includes an aperture, said mounting pad adapted to be fastened to said bracket by way of said aperture.

4. A lock feature for a car engine air cooling system having at least one engine cooling fan, comprising:

a bracket with a mounting seat for a shroud, comprising at least one twist lock having:

an arm located at a side surface of said shroud and protruding radially from said surface, a first cantilever extending from said arm at a substantially right angle thereto, said mounting seat matching said first cantilever and having a clinch to be engaged by said first cantilever upon applying said shroud to said bracket and twisting said shroud relative to said bracket, and a mounting pad including an ear located at said side surface of said shroud and a hole made in said bracket to coincide with a hole in said ear in said twisted position of said shroud and to be fed through with a fastening means for fastening said shroud to said bracket.

5. The feature according to claim 4, further comprising a means for forcibly carrying out said engagement of said first cantilever and said clinch.

6. The feature according to claim 5 wherein said forcing means comprises:

a first rib made on a surface of said first cantilever and a second cantilever made on said bracket, said second cantilever being provided with a second rib and adapted to resiliently yield upon said second rib being passed by said first rib upon said twisting of said shroud to said coinciding position, a clearance between a plane of an inner surface of said clinch and a plane of an outer surface of said second cantilever being no less than combined width of said first cantilever and height of said first rib.

7. The feature according to claim 4, wherein said arm protrudes outwardly from said shroud.

8. The feature according to claim 4, further comprising two more twist locks of the same construction, the three said locks being successively circumferentially located at an angular distance of 90° from each other.

* * * * *